No. 620,132. Patented Feb. 28, 1899.
H. C. HOLTHOFF.
COMBINED ORE ROASTING OVEN AND COOLING HEARTH.
(Application filed June 21, 1897.)
(No Model.) 5 Sheets—Sheet 4.
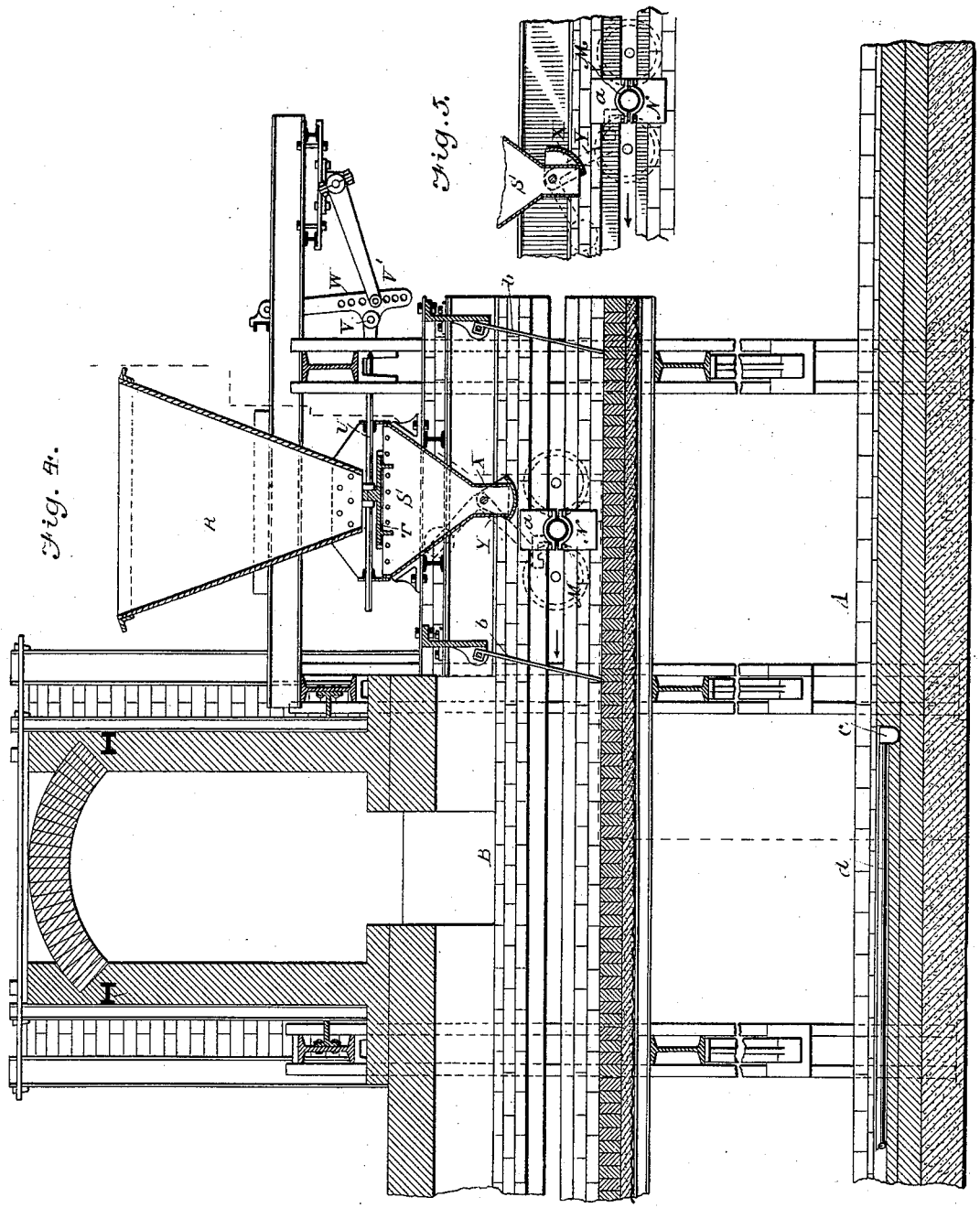
WITNESSES:
INVENTOR:

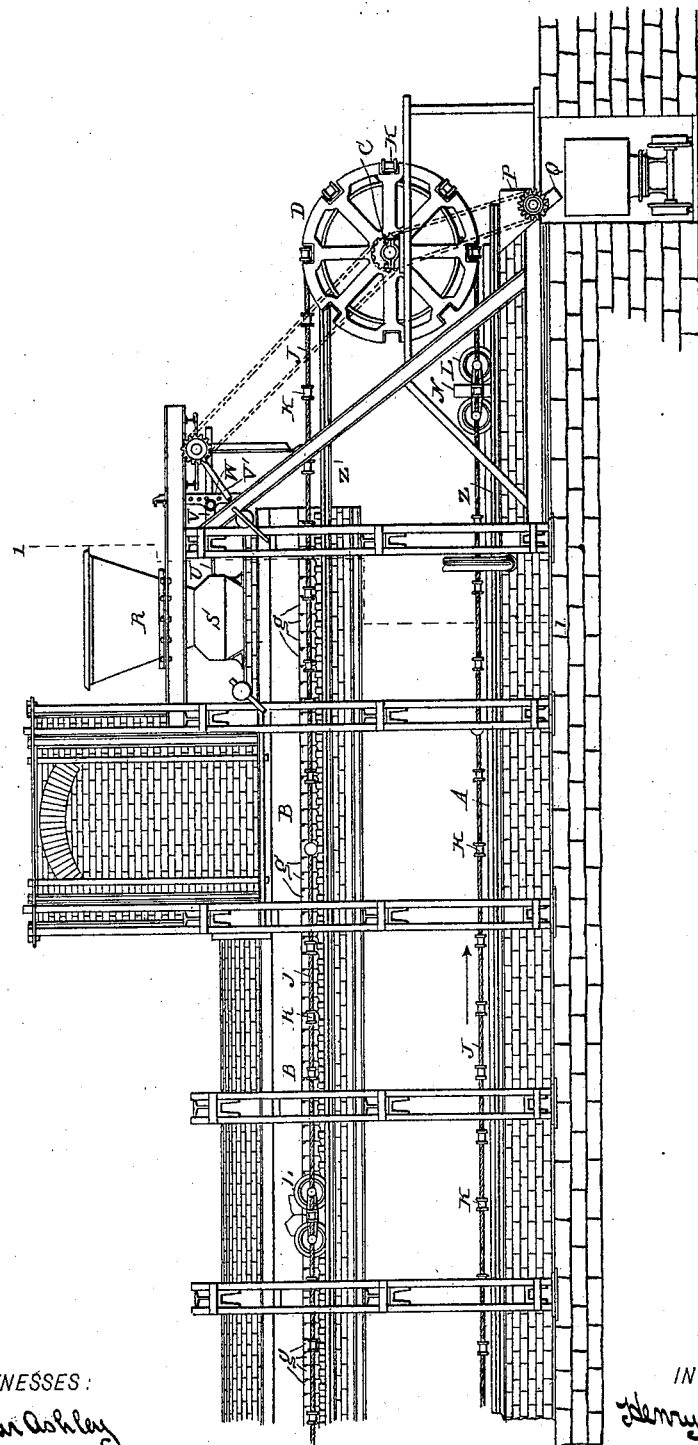

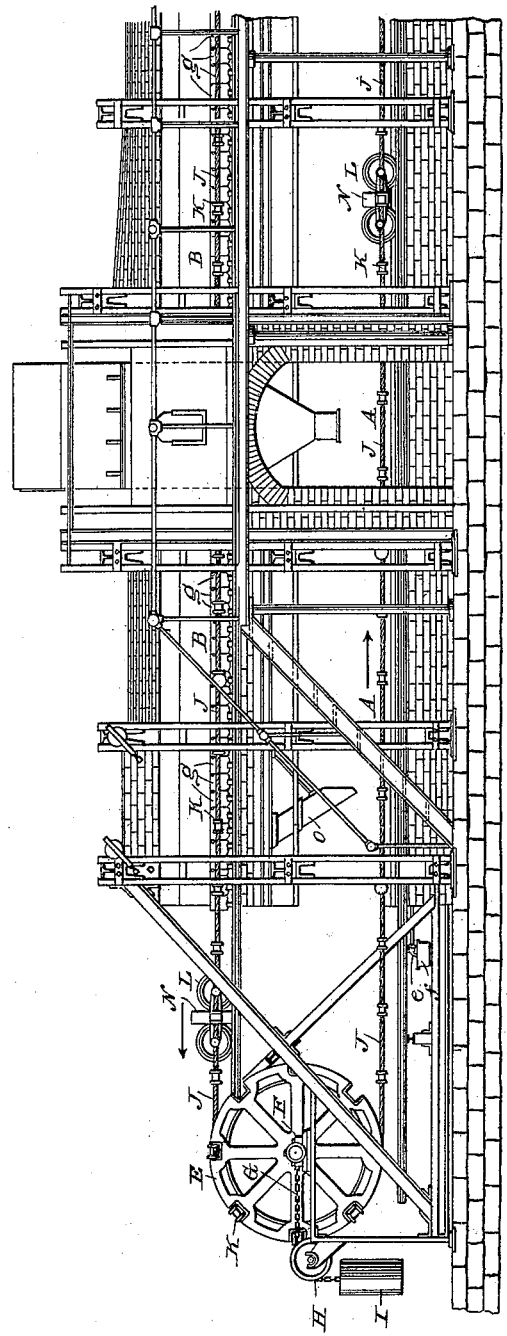

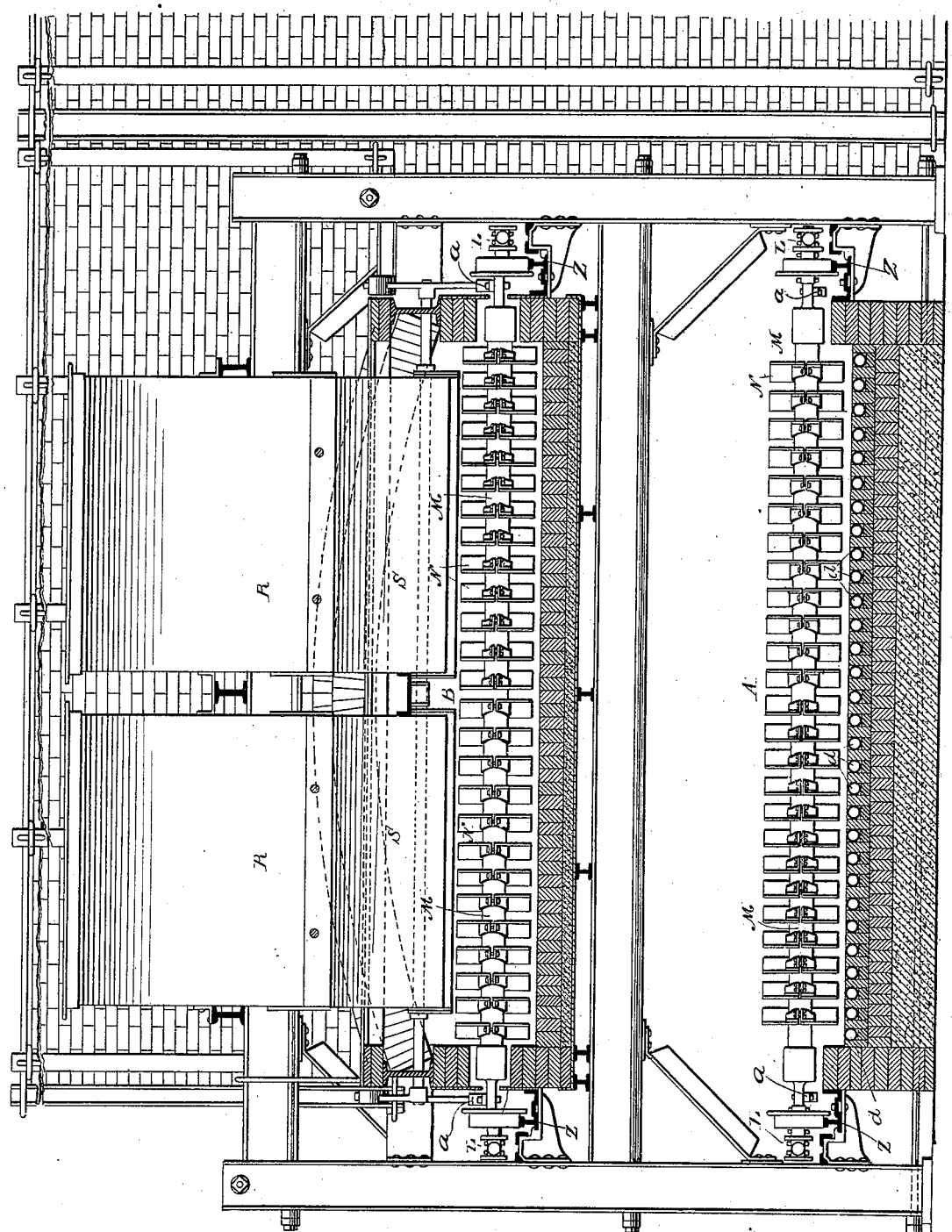

No. 620,132. Patented Feb. 28, 1899.
H. C. HOLTHOFF.
COMBINED ORE ROASTING OVEN AND COOLING HEARTH.
(Application filed June 21, 1897.)
(No Model.) 5 Sheets—Sheet 5.
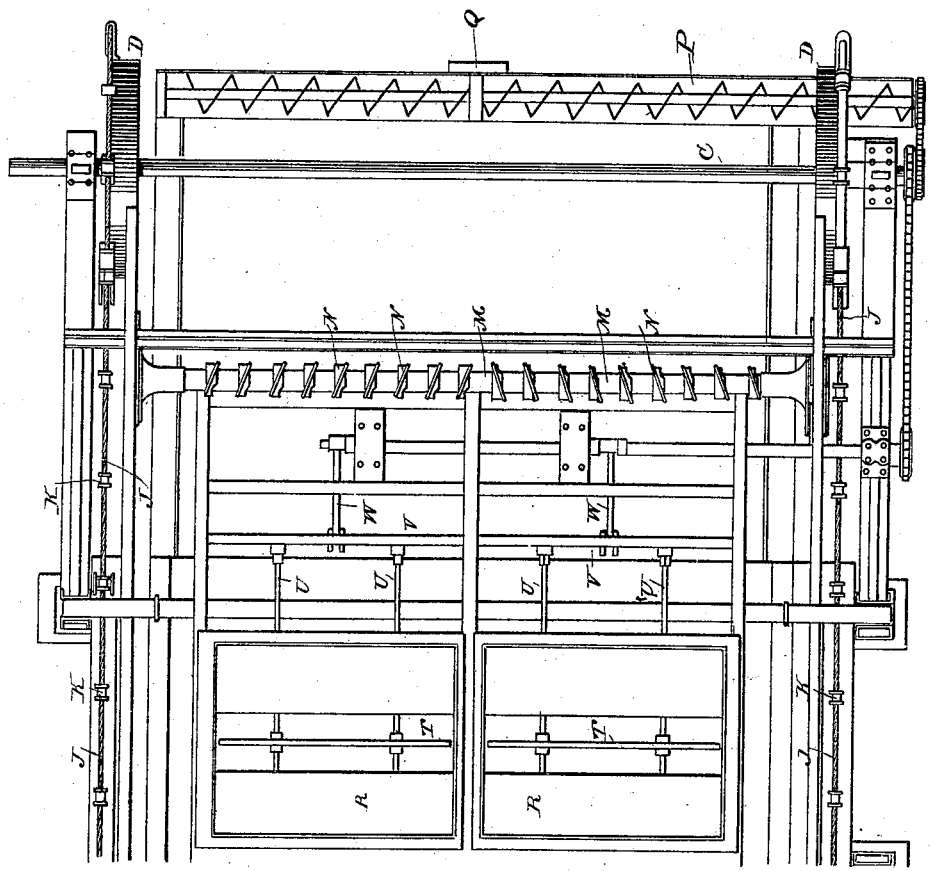
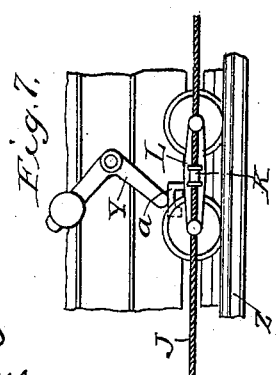
WITNESSES: INVENTOR:

UNITED STATES PATENT OFFICE.

HENRY C. HOLTHOFF, OF MILWAUKEE, WISCONSIN, ASSIGNOR OF ONE-HALF TO THE EDWARD P. ALLIS COMPANY, OF SAME PLACE.

COMBINED ORE ROASTING-OVEN AND COOLING-HEARTH.

SPECIFICATION forming part of Letters Patent No. 620,132, dated February 28, 1899.

Application filed June 21, 1897. Serial No. 641,655. (No model.)

*To all whom it may concern:*

Be it known that I, HENRY C. HOLTHOFF, a citizen of the United States, residing at Milwaukee, in the county of Milwaukee and State of Wisconsin, have invented certain new and useful Improvements in a Combined Ore Roasting-Oven and Cooling-Hearth, of which the following is a specification.

My present invention relates to a combined ore roasting-oven and cooling-hearth, the construction and advantages of which will be hereinafter pointed out, reference being had to the accompanying drawings, wherein—

Figures 1 and 2 are side elevations of the different ends of the apparatus, respectively; Fig. 3, a cross-sectional view on the line 1 1 of Fig. 1; Fig. 4, a longitudinal sectional view taken through the center of the machine; Fig. 5, a detail view; Fig. 6, a top plan view of discharge end of the cooling-hearth, and Fig. 7 a side elevation showing the mechanism for closing the hopper.

The main object of my invention is to secure a compact apparatus wherein the roasting-hearth is located above the cooling-hearth, by which arrangement the material can be traversed the necessary length upon both hearths and fed in and discharged from the same end of the apparatus.

Another advantage resides in the construction of the feeding-hoppers, whereby material is prevented from falling and lodging on the rabbles or stirrers as they pass beneath the same.

A further advantage resides in the construction of the cooling-hearth, as will be hereinafter described.

Other advantages are present and will be pointed out in the following specification.

Referring to Figs. 1 to 4, inclusive, A denotes the cooling-hearth, and B the oven or roasting-hearth located directly above the same and supported by means of any desired structural work, the structure shown being preferred, as all the supporting-beams are exposed to the atmosphere and are thus protected to a large degree from the heat of the furnace and the fumes arising from the material under treatment.

Figs. 1 and 2, as above stated, represent opposite ends of the apparatus, which may be made of any length desired.

Upon reference to Fig. 1 it will be seen that the cooling-hearth extends a slight distance beyond the roasting-hearth. At this end, or, as I term it, the "feed" and "discharge" end, there is mounted upon suitable framing a cross-shaft C, carrying at its ends in line with tracks Z Z, extending along the sides of the hearths, sprocket or spider wheels D D. Similar wheels E E are provided at the opposite end of the apparatus, being secured upon a cross-shaft, which is mounted in sliding bearings F, mounted upon suitable framework. A chain G is connected to the shaft, passes over a pulley H, and is connected to a weight I, said weight tending to draw the shaft back and to keep the endless driving belts or ropes J, which pass about the wheels, taut. The ropes are provided with buttons or blocks K, designed to enter the recesses in the wheels D and E by which the ropes are driven.

Secured to the driving-chains are carriages L, the wheels of which run upon the tracks at the side of the hearths, as clearly shown in Fig. 3. A shaft M extends across from one carriage to that directly opposite, and upon said shaft are secured a series of blades N, so set and arranged that as they are drawn forward they will have a tendency to stir up the material under treatment and at the same time feed it forward. These blades and the shaft are what are commonly known as the "rabbles" and will be hereinafter alluded to by that name. These rabbles are secured at intervals along the chains, and, as just stated, feed the material along first from the delivery end of the roasting-hearth to its opposite end, where it descends through a chute O to the cooling-hearth below, upon which it is fed along to the discharge end into a hopper P, fitted with a worm tending to bring the material to a discharge-spout Q.

R denotes the feed-hopper, below which is a supplemental hopper S, and intermediate of the two is a reciprocating feed-slide T, connected by rods U to a cross-bar V, which is suspended by pivoted links W. Bar V is connected to pitman V', and reciprocating motion is imparted to them by cranks upon the shaft to which they are connected.

The lower end of the hopper S is somewhat contracted and there is hinged or pivoted to it a counterweighted valve X. A bell-crank lever Y, carrying at one end the counterweight, is connected to the valve, the opposite end of the arm projecting downwardly when the valve is open in line with the carriage L.

A bracket $a$ is secured to each carriage and is designed to come in contact with the downwardly-projecting arm of lever Y as the carriage passes beneath the mouth of the hopper. In Fig. 5 the bracket has just come in contact with the depending arm and as it moves forward the gate or valve will be closed, entirely so as the rabble comes beneath it, as denoted in Fig. 4. It remains shut until the rabble has passed from beneath the hopper. Swinging gates $b$ are also employed upon each side of the hopper, so that the chamber above the roasting-hearth may be kept as nearly closed as possible. As the rabbles open one the other remains closed, they being far enough apart to prevent both being acted upon or opened at the same time. The openings in the side walls of the roasting-hearth through which the rabble-shafts extend may be closed by any suitable gravitating gates or doors $g$—such, for instance, as shown in United States patent to A. H. Wethey, No. 565,312, dated August 4, 1896.

The discharge end of the roasting-hearth may also be provided with a trap-door.

Referring to Fig. 4, $c$ denotes a main or cross pipe of large capacity extending transversely of the cooling-hearth. To this main are connected a series of pipes $d$, which run lengthwise of the cooling-hearth and extend out beyond the end thereof, Fig. 2, where each is provided with a draw-off cock $e$, which discharges into a receptacle $f$. By this means the hearth may be cooled to a nicety.

The speed with which the rabbles will be moved is of course to be determined by the nature or composition of the ore under treatment and the heat employed.

Having thus described my invention, what I claim is—

1. In an apparatus for treating ore, the combination of a hearth; a chute located above the same; a gate or valve pivoted to said chute and designed normally to stand open; a rabble designed to pass over the hearth beneath the chute; and means for closing said gate carried by the rabble.

2. In an apparatus for treating ore, the combination of a hearth; a chute located above the same; a valve or gate pivoted to said chute and provided with a bell-crank arm or lever having a weight secured to one end to normally hold said valve open; a rabble designed to pass over the hearth beneath said chute; and means carried by said rabble for engaging the downwardly-extending arm of the bell-crank lever for closing said valve as the rabble passes beneath the chute.

3. In a cooling-hearth for ore-treating apparatus, the combination of a main or pipe $c$ extending transversely of and beneath the surface of the hearth; a series of pipes $d$ connected to said main, extending longitudinally of the hearth at or immediately below its surface; and means for regulating the discharge from said pipes $d$.

4. In an ore-roasting apparatus, the combination of a roasting-hearth; a cooling-hearth located below the same, said cooling-hearth being provided with a main or pipe $c$ extending transversely of and beneath the surface of the hearth; a series of laterals $d$ connected to and extending from said main at or immediately below the surface of the hearth; means for controlling the discharge from said pipes $d$; and means for traversing the ore over the roasting-hearth, and depositing it upon and moving it over the cooling-hearth, substantially as described.

In witness whereof I hereunto set my hand in the presence of two witnesses.

HENRY C. HOLTHOFF.

Witnesses:
WM. BARMEN,
W. D. GRAY.